United States Patent
Wu

(10) Patent No.: US 6,603,719 B1
(45) Date of Patent: Aug. 5, 2003

(54) SPEED CONTROL OF OPTICAL INFORMATION REPRODUCING APPARATUS BASED ON STORAGE QUANTITY OF A BUFFER MEMORY DURING ACCESS OPERATION

(76) Inventor: Tung-Ke Wu, c/o Asustek Computer Inc., 4th Fl., No. 150, Li-Te Rd., Peitou, Taipei (TW)

( * ) Notice: Subject to any disclaimer, the term of this patent is extended or adjusted under 35 U.S.C. 154(b) by 0 days.

(21) Appl. No.: 09/548,462

(22) Filed: Apr. 13, 2000

(30) Foreign Application Priority Data

Jul. 20, 1999 (TW) ........................................ 88112256 A

(51) Int. Cl.[7] .......................... G11B 19/28; G11B 11/18; G11B 19/06; G11B 19/247; G11B 20/10
(52) U.S. Cl. ................ 369/47.33; 369/47.3; 369/47.38; 369/30.23; 710/57
(58) Field of Search ..................... 711/112, 4; 701/200; 369/50, 116, 239, 47.38, 30.23, 47.3, 47.33, 47.43; 710/57, 56

(56) References Cited

U.S. PATENT DOCUMENTS

| | | | | |
|---|---|---|---|---|
| 4,603,412 A | * | 7/1986 | Yamazaki | 369/47.48 |
| 5,471,442 A | * | 11/1995 | Shimizume | 369/30.23 |
| 5,625,615 A | * | 4/1997 | Dente et al. | 369/47.3 |
| 5,684,703 A | * | 11/1997 | Itoh et al. | 701/200 |
| 5,710,943 A | * | 1/1998 | Burton et al. | 710/52 |
| 5,805,548 A | * | 9/1998 | Ishihara et al. | 369/47.43 |
| 6,269,061 B1 | * | 7/2001 | Shimizume et al. | 369/47.3 |
| 6,272,589 B1 | * | 8/2001 | Aoki | 711/112 |

FOREIGN PATENT DOCUMENTS

| | | |
|---|---|---|
| CN | 1132908 A | 10/1996 |
| JP | 59090262 A | 5/1984 |
| JP | 61139984 A | 6/1986 |
| JP | 63002165 A | 1/1988 |
| JP | 63002166 A | 1/1988 |
| JP | 02203469 A | 2/1989 |
| JP | 05325506 A | 5/1992 |
| JP | 06176479 A | 6/1994 |
| JP | 10340518 A | 6/1998 |
| JP | 2001043606 A | * 2/2001 |

* cited by examiner

Primary Examiner—B. James Peikari
(74) Attorney, Agent, or Firm—Stetina Brunda Garred & Brucker

(57) ABSTRACT

A method for controlling the speed of a spindle motor of an optical information reproducing apparatus is provided. The method determines whether a data quantity of a buffer memory is sequentially larger than a first predetermined quantity during a period of read operation. If yes, the spindle motor is decelerated to a predetermined speed. The method also determines whether the data quantity of the buffer memory is sequentially less than a second predetermined quantity during a period of read operation. If so, the spindle motor is accelerated to a predetermined speed. The method according to the invention can automatically tune the speed of the spindle motor to a suitable speed to eliminate the noise that normally accompanies faster operation without lowering the information reproducing efficiency of the optical information reproducing apparatus.

10 Claims, 3 Drawing Sheets

SPEED CONTROL OF OPTICAL INFORMATION REPRODUCING APPARATUS BASED ON STORAGE QUANTITY OF A BUFFER MEMORY DURING ACCESS OPERATION

CROSS-REFERENCE TO RELATED APPLICATIONS (Not applicable)

STATEMENT RE: FEDERALLY SPONSORED RESEARCH/DEVELOPMENT (Not applicable)

FIELD OF THE INVENTION

The present invention relates to speed control of an optical information reproducing apparatus, and more in particular, to speed control of the optical information reproducing apparatus based on storage quantity of a buffer memory therein during access operation.

BACKGROUND OF the INVENTION

The optical information reproducing apparatus, such as CD-ROM, DVD-ROM, CD-RW or DVD-RAM, has been a basic component of a multi-media computer system.

The U.S. Pat. Nos. 4,485,337, 4,783,774, 5289,097, 5246,479, and 5,345,347 disclose prior arts of control system relating to the optical information reproducing apparatus.

Nowadays, the nominal operation speed of commercial optical information reproducing apparatus is represented by multiples of a basic unit, X. It is well known that 1X is equal to 176 kilobytes per second for CD-ROM standard. The key component affecting the nominal operation speed of the optical information reproducing apparatus is the rotation rate of spindle motor inside the optical information reproducing apparatus. In general, at the commencement of read operation of optical information reproducing apparatus, the optical information reproducing apparatus is set at a predetermined maximum speed. As lower read rate occurs due to various conditions, e.g., out-of-focus, eccentric or vibration of optical disc, the optical information reproducing apparatus will automatically lower its operation speed to achieve a correct rate. In addition, for some optical discs having specific data format, the optical information reproducing apparatus sets a read rate specifically corresponding to the data format of disc to achieve a preferred read rate. The well known data format types include CD-Audio disclosed by Red Book, CD-ROM Model, CD-ROM Mode2 disclosed by Yellow Book, CD-ROM Mode2/XA Forml, CD-ROM Mode2/XA Form2 disclosed by Green Book, Recordable Compact Disc Standard disclosed by Orange Book, etc. The types of disc data formats readable to an optical information reproducing apparatus are stored within the firmware of the optical information reproducing apparatus. As the optical disc with an extended data format, such as MP3 format or PC-Game format read by the optical information reproducing apparatus, is not one of the well known data format types, the optical information reproducing apparatus treats the extended data format as a general data format type and reads the optical disc by allowable maximum speed. Under this condition, usually a software or hardware decoding approach is required in the optical information reproducing apparatus to determine and set the operating speed of optical information reproducing apparatus. However, this approach is expensive and difficult to implement.

The current design for the optical information reproducing apparatus gravitates towards higher operation thereof. However, noise due to wind-cutting, vibration and motor humming usually accompanies higher operation speed of the optical information reproducing apparatus. The noise is specifically significant with respect to disc of non-standard data format running at allowable maximum speed. The noise combined with the eccentric defect associated with the optical disc may seriously jeopardize the reproduction of data, i.e., audio and video effect, of the disc.

In addition, as the data read rate of data required when an application requires a data reading rate far less than that provided by the optical information reproducing apparatus, the optical information reproducing apparatus will still be operated at higher speed, to consume unnecessary power and shorten the lifetime of spindle motor.

The foregoing and other state-of-the-art control systems for optical information reproducing apparatus indicate the need for a new method of automatically tuning the rotation rate of spindle motor at a suitable rate to eliminate noise and yet without affecting information reproducing efficiency of the optical information reproducing apparatus. It is also desired to obtain a control system for driving an optical information reproducing apparatus with a relatively low power consumption and a high power conversion efficiency. The present invention is directed toward satisfying the aforesaid need.

SUMMARY OF THE INVENTION

One objective of the invention is to provide a method which automatically tunes the speed of the spindle motor at a suitable rate to eliminate noise and lower power consumption without affecting information reproducing efficiency.

In the invention, the optical information reproducing apparatus has a buffer memory for temporarily storing data read from the optical disc. The method of the invention is to decelerate or accelerate the spindle motor by monitoring the storage quantity of the buffer memory during operation.

According to a first preferred embodiment of the invention, a method for controlling rotation rate of the spindle motor determines if the storage quantity of the buffer memory is successively larger than a first predetermined quantity during a period of read operation, and, if so, the spindle motor is decelerated with a predetermined variation rate. The method also determines whether the storage quantity of the buffer memory is successively less than a second predetermined quantity during a period of read operation, and, if so, the spindle motor is accelerated with the predetermined variation rate.

According to a second preferred embodiment of the invention, a method for controlling speed of the spindle motor determines if the storage quantity of the buffer memory is successively larger than a first predetermined quantity during a period of read operation, and determines if a waiting time is longer than a predetermined time. If so, the spindle motor is decelerated with a predetermined variation rate. The waiting time represents the time consumed in waiting for an instruction asserted by the application program, which requests data transfer. The method also determines if the storage quantity of the buffer memory is successively less than a second predetermined quantity during a period of read operation, and, if so, the spindle motor is accelerated with the predetermined variation rate.

The advantages and spirit of the invention will be rendered more comprehensible by the following recitations accompanied by the appended drawings.

BRIEF DESCRIPTION OF THE APPENDED DRAWINGS

DETAILED DESCRIPTION OF THE INVENTION

The invention is to provide a method for automatically tuning rate of a spindle motor inside a typical optical information reproducing apparatus at a suitable rate during access operation.

Figure 1:
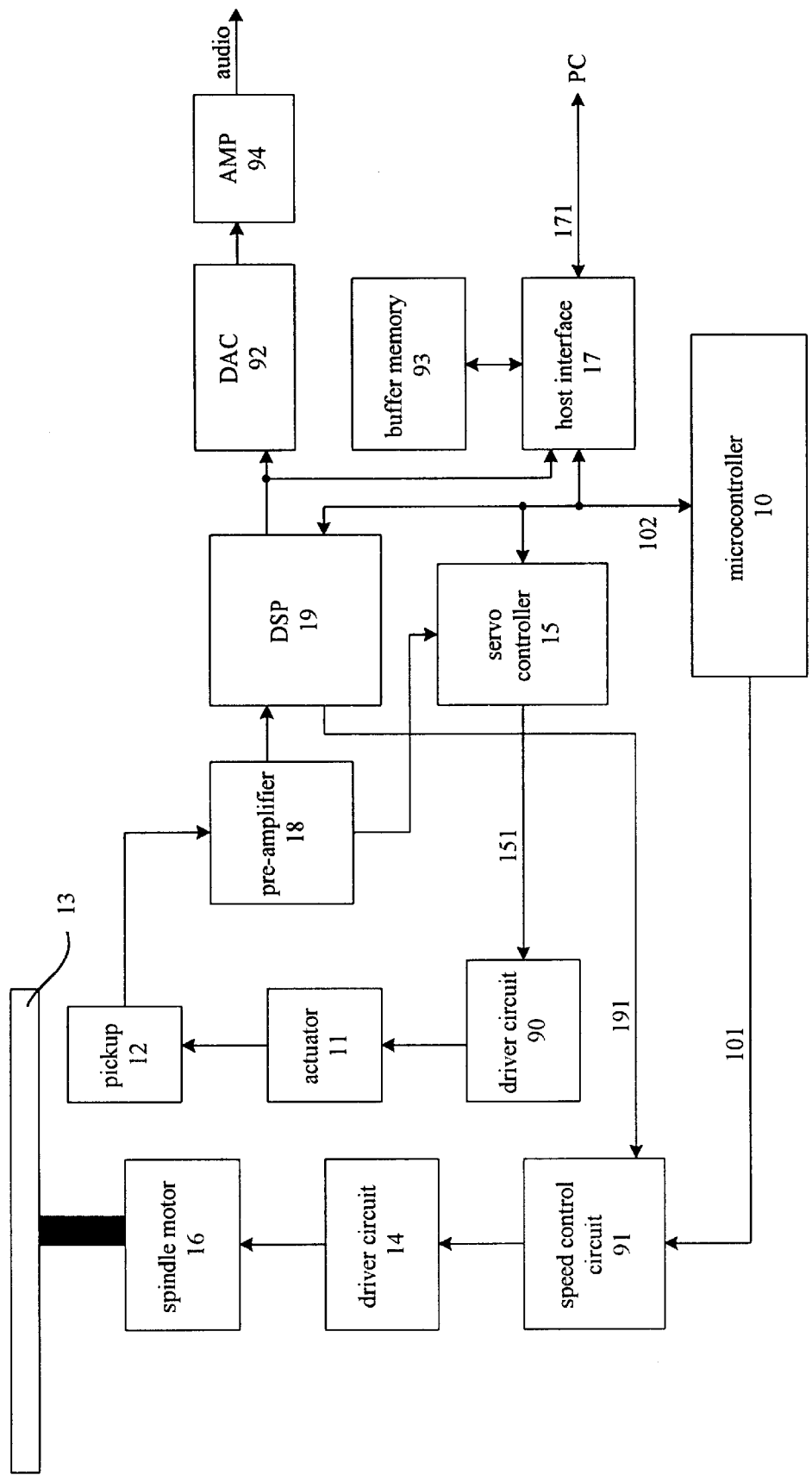
FIG. 1 shows mechanical and electrical components of a disc system in which the present invention may be employed.

Referring to FIG. 1, the mechanical and electrical components of a typical optical information reproducing apparatus includes a head/disc assembly (HDA) having therein an actuator 11, which preferably includes a radial coil, a focus coil and an actuator motor which positions the optical pickup 12 to different radial positions relative to the surface of disc 13. HDA also includes a read preamplifier circuitry 18 for amplifying data and servo information from the disc surface. The preamplifier circuitry 18 also contains a read buffer (not shown) for supplying data read from the particular selected track. The digital signal processor (DSP) 19 receives analog read data from circuitry 18 in the HDA. As well known in the arts, DSP 19 includes a read channel analog filter which supplies the analog signal to a pulse detector (not shown). The output of pulse detector, as raw digital data, is supplied to a data separator (not shown). The disc drive control circuit further includes a servo information from disc 13 relating to servo bursts, sync pulses and track ID number indicating the radial position of optical pickup 12 relative to the disc surface. The disc drive circuitry components, i.e., 15, 19, interface with a microcontroller 10 through a bus 102 which carries address, control and data information, as well known in the art. Servo controller section 15 connects to microcontroller 10 through bus 102 and controls the flow of information relating to servo read timing and control. Servo controller section 15 preferably includes servo controller, analog-to-digital (A/D) converter circuitry and digital-to-analog (D/A) circuitry. The analog output 151 from servo controller section 15 is supplied as an input to the actuator driver circuitry 90. The circuitry 90 includes power amplifier control circuitry which supplies an actuator drive signal to a power amplifier which in turn supplies control current to actuator 11 in HDA. The optical information reproducing apparatus also includes a spindle motor control driver circuitry 14 for controlling the spindle motor 16 in HDA for rotating audio-video disc 13. The disc drive also includes a host interface 17 which provides control and information channels between itself and a host computer (PC) through a bus 171 and between itself and the associated elements through a bus 102. A buffer memory 93 is provided to accommodate differences in data transfer rate between the host interface 17 and host computer and that between the host interface 17 and drive. In other words, the video-audio information read from the disc 13 is temporarily stored in the buffer memory 93. The DSP 19 also provides a feedback signal 191 into a digital motor speed control circuit 91 which compares the feedback signal 191 with a signal line 101 from microcontroller 10. The result of comparison indicates whether the motor is spinning too fast or too slow at the present time with regard to data transfer rate. The result of the comparison is used to control the driver circuit 14, which provides power to the spindle motor 16. The element 92 is a digital-analog converter (DAC) and the element 94 is an amplifier.

As described above, data stored in the disc 13 and buffer memory 93 and data transferred between the disc 13 and buffer memory 93 and transferred between the buffer memory 93 and host computer all take "block" as a basic unit. In addition, the maximum storage quantity $B_{max}$ of the buffer memory 93 takes multiples of blocks. Hereinafter, B(t) denotes the storage quantity of the buffer memory 93, R(t) denotes the accumulated quantity of data required by the application executed in the host computer, and I(t) denotes the quantity of data read from the optical disc 13. It is noted that B(t), R(t) and I(t) are functions of time. At a first time point $t_1$, the storage quantity of the buffer memory 93 is $B(t_1)$. Further at a second time point $t_2$, the storage quantity of the buffer memory 93 is $B(t_2)$. $B(t_2)$ is calculated by the following equation:

$$B(t_2)=B(t_1)+[I(t_2)-I(t_1)]-[R(t_2)-R(t_1)]$$

where $B(t_1)$ and $B(t_2)$ are less than or equal to $B_{max}$.

In the invention, the method is based on the storage quantity B(t) of the buffer memory 93 during access operation to determine the spindle motor 16 to speed down or speed up. That is, when the storage quantity B(t) of the buffer memory 93 is successively larger than a predetermined quantity $B_{first}$, the spindle motor is decelerated. When the storage quantity B(t) is successively less than a predetermined quantity $B_{second}$ the spindle motor is accelerated. In the following detailed description of the present invention, several preferred embodiments are set forth in order to provide a thorough understanding of the present invention.

Figure 2:
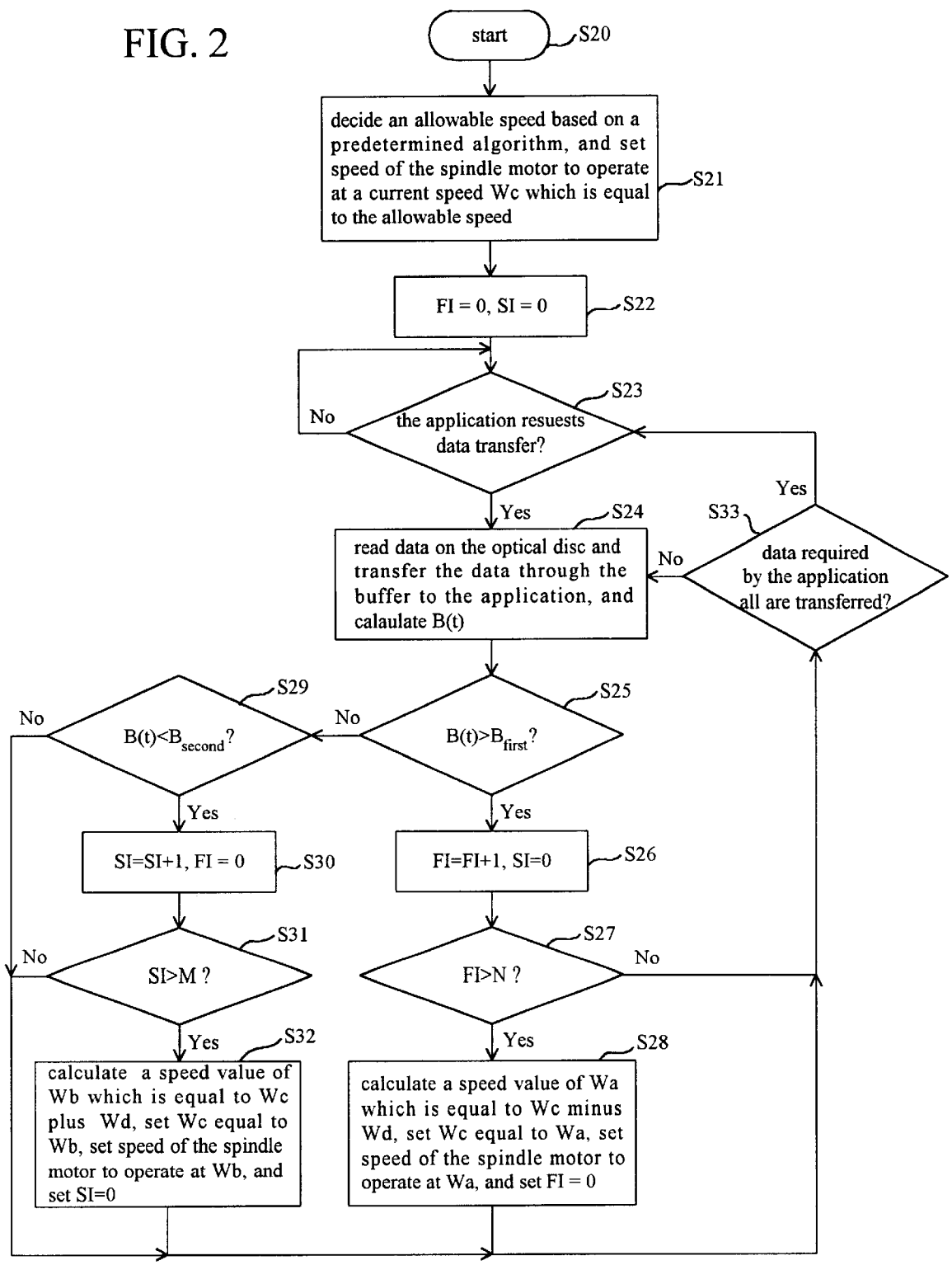
FIG. 2 shows the method according to a first preferred embodiment of the invention using flow chart methodology.

As shown in a flow chart of FIG. 2, the method according to the first preferred embodiment of the invention starts in step S20. In step S21, an allowable rate is decided based on a predetermined algorithm. For instance, the predetermined algorithm detects the format type of the optical disc and the condition of out-of-focus. In step S21, the method also sets the rotation rate of the spindle motor 16 to operate at a current speed Wc which is equal to the allowable speed. In step S22, the method sets both a first index FI and a second index SI as 0. In step S23, the method decides if the application executed in the host computer requests data transfer. If Yes in step S23, step S24 is executed. In step S24, the method reads data on the optical disc and stores the data into the buffer memory. In step S24, the method also transfers data from the buffer memory 93 to the application. Also in step S24, the method calculates the storage quantity B(t) of the buffer memory 93. In step S25, the method determines if the storage quantity B(t) is larger than the predetermined quantity $B_{first}$.

If Yes in step S25, step S26 is executed. In step S26, the method sets the first index FI equal to FI plus 1 and the second index SI equal to 0. After step S26, step S27 is executed. In step S27, the method determines if the first index FI is larger than a predetermined number N where N is a natural number. If Yes in step S27, step S28 is executed. In step S28, a first speed value of Wa is calculated and Wa is set as Wc minus Wd where Wd is a predetermined variation value. Afterwards, the method sets the speed of the spindle motor 16 to operate at the first speed value of Wa, and sets the first index FI equal to 0. After step S28, or if No in step S27, step S33 is executed. In step S33, the method decides if data required by the application all are transferred. If Yes in step S33, the method goes back to step S23. If No in step S33, the method goes back to step S24.

If No in step S25, step S29 is executed. In step S29, the method determines if the storage quantity B(t) is less than the second predetermined quantity $B_{second}$. If Yes in step S29, step S30 is executed. In step S30, 1 is added to the second index SI and sets the first index FI is set as 0. After step S30, step S31 is executed. In step S31, the method determines if the second index SI is larger than a second predetermined number M where M is a natural number. If Yes in step S31, step S32 is executed. In step S32, a second speed value of Wb is calculated and Wb is set as Wc plus Wd. Afterwards, the method sets the speed of the spindle motor 16 to operate at the second speed value of Wb and sets the second index SI as 0. After step S32, or if No in step S29, or if No in step S31, step S33 is executed.

As described above, it is obvious that the deceleration condition for the spindle motor 16 is decided only when the storage quantity B(t) of the buffer memory 93 is larger than the first predetermined quantity $B_{first}$ at data transfer of N sequential times. It is also obvious that the acceleration condition for the spindle motor 16 is decided only when the storage quantity B(t) of the buffer memory 93 is less than the second predetermined quantity $B_{second}$ at data transfer of M sequential times. This approach can avoid data transfer interruption or power waste due to rash deceleration or acceleration of the spindle motor 16 only by determination of the storage quantity B(t) of the buffer memory 93 during short time or even at data transfer of single time. Therefore, the method of the invention can automatically tune the speed of the spindle motor at a suitable speed without affecting the information reproducing efficiency of the optical information reproducing apparatus.

In an embodiment, the aforesaid steps involving calculation and determination of the storage quantity B(t) can be implemented by the microcontroller 10. In step S29, the spindle motor 16 is decided to be decelerated or accelerated. The microcontroller 10 sends a signal to the motor speed control circuit 91 via the signal line 101. The motor speed control circuit 91 then instructs the spindle motor control driver circuitry 14 to decelerate or accelerate the spindle motor 16 to the speed as desired.

Figure 3:
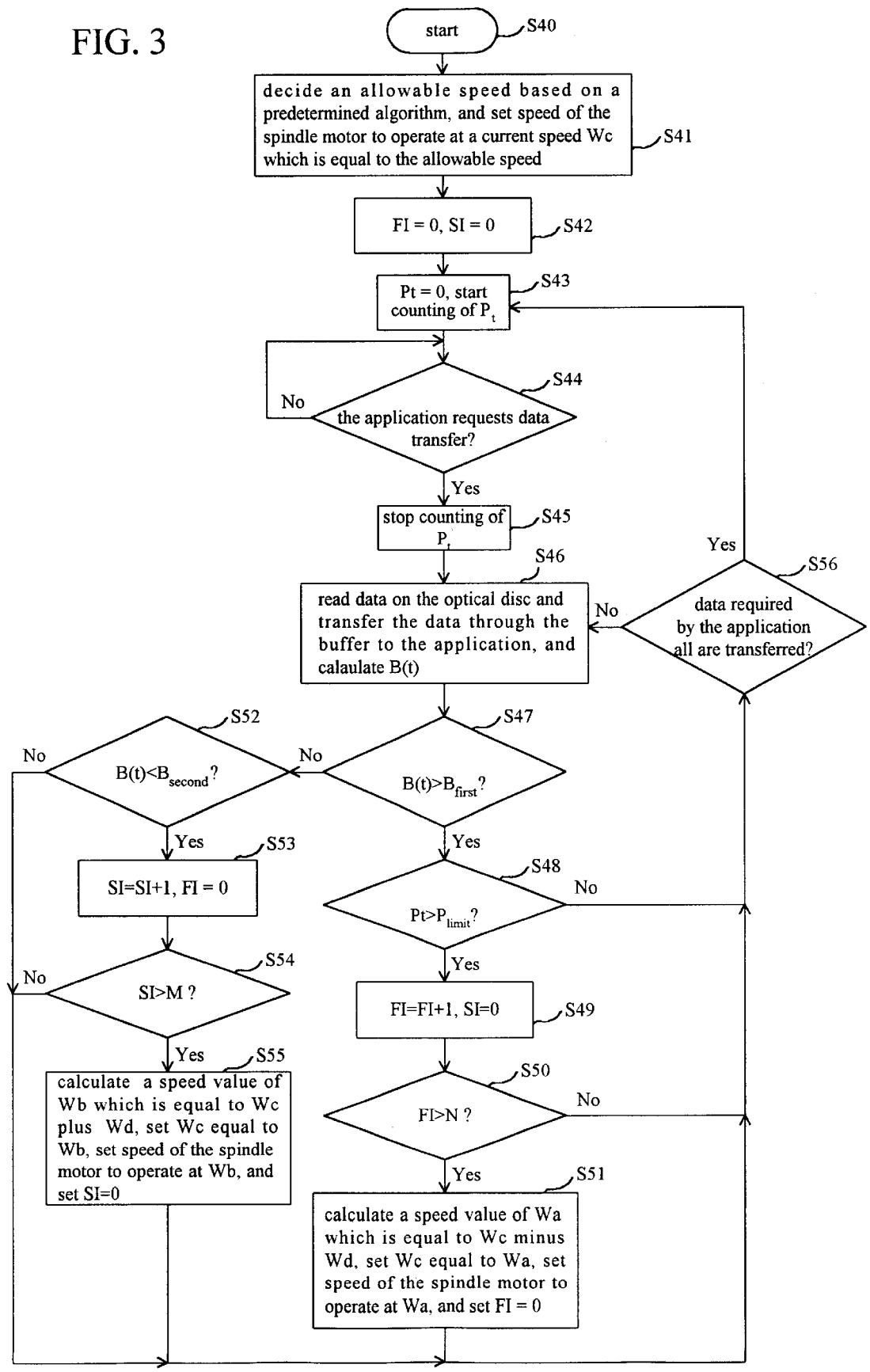
FIG. 3 shows the method according to a second preferred embodiment of the invention using flow chart methodology.

As shown in a flow chart of FIG. 3, the method according to the second preferred embodiment of the invention is shown. In the second preferred embodiment, the method decides the deceleration condition of the speed of the spindle motor not only by determining if the storage quantity B(t) is larger than the first predetermined quantity but also by determining if a waiting time $P_t$ is longer than a predetermined time $P_{limit}$. The waiting time $P_t$ represents the time consumed in waiting for an instruction asserted by the application, which requests data transfer. It is noted that when the application is a test program used to test the performance of the optical information reproducing apparatus, request for data transfer is repeatedly asserted by the test program. Therefore, rash deceleration of the spindle motor will reduce the performance of the optical information reproducing apparatus estimated by the test program. It is obvious that the method according to the second preferred embodiment of the invention can give the test program with accurate response and decelerate the spindle motor at a suitable time to prevent from overheating of the spindle motor.

As shown in FIG. 3, the method according to the second preferred embodiment of the invention starts in step S40. In step S41, an allowable speed is decided based on a predetermined algorithm. For instance, the predetermined algorithm detects the format type of the optical disc and the condition of out-of-focus. In step S41, the method also sets speed of the spindle motor 16 to operate at a current speed Wc which is equal to the allowable speed. In step S42, the method set both a first index FI and a second index SI as 0. In step S43, the method sets the waiting time Pt as 0, and, afterwards, the method starts counting of the waiting time Pt. In step S44, the method decides if the application executed in the host computer requests data transfer. If Yes in step S44, step S45 is executed. In step S45, the method stops the counting of the waiting time Pt. After step S45, step S46 is executed. In step S46, the method reads data on the optical disc and stores the data into the buffer memory 93. In step S46, the method also transfers data from the buffer memory to the application. Also in step S46, the method calculates the storage quantity B(t) of the buffer memory. In step S47, the method determines if the storage quantity B(t) is larger than the predetermined quantity $B_{first}$.

If Yes in step S47, step S48 is executed. In step S48, the method determines if the waiting time Pt is longer than the predetermined time $P_{limit}$. If Yes in step S48, step S49 is executed. In step S49, 1 is added to the first index FI and the second index SI is set as 0. After step S49, step S50 is executed. In step S50, the method determines if the first index FI is larger than a predetermined number N where N is a natural number. If Yes in step S50, step S51 is executed. In step S51, the method calculates a speed value of Wa equal to Wc minus a Wd. Wd is a predetermined variation value. Afterwards, the method sets the speed of the spindle motor 16 to operate at the speed value of Wa, and sets the first index FI as 0. After step S51, or if No in step S48, or if No in step S50, step S56 is executed. In step S56, the method decides if data required by the application all are transferred. If Yes in step SS6, the method goes back to step S43. If No in step S56, the method goes back to step S46.

If No in step S47, step S52 is executed. In step S52, the method determines if the storage quantity B(t) is less than the second predetermined quantity $B_{second}$. If Yes in step S52, step S53 is executed. In step S53, 1 is added to the second index SI and the first index FI is set as 0. After step S53, step S54 is executed. In step S54, the method determines if the second index SI is larger than a second predetermined number M where M is a natural number. If Yes in step S54, step S55 is executed. In step S55, the method calculates a speed value of Wb equal to Wc plus a Wd. Afterwards, the method sets the speed of the spindle motor 16 to operate at the speed value of Wb, and sets the second SI as 0. After step S55, or if No in step S52, or if No in step S54, step S56 is executed.

The specific arrangements and methods described herein are merely illustrative of the principles of this invention. Numerous modifications in form and detail may be made without departing from the scope of the described invention. Although this invention has been shown in relation to some particular embodiments, it should not be considered so limited. Rather, the described invention is limited only by the scope of the appended claims.

What is claimed is:

1. A method for controlling speed of a spindle motor of an optical information reproducing apparatus, wherein the spindle motor drives an optical disc disposed within the optical information reproducing apparatus, and the optical information reproducing apparatus comprises a buffer memory, such that data required by an application is read from the optical disc and transferred to the application via the buffer memory, the method comprising:

determining an initial speed for the spindle motor to rotate based on a predetermined algorithm;

rotating the spindle motor with the initial speed;

reading the data from the optical disc and temporarily storing the data into the buffer memory;

monitoring a data storage quantity in the buffer memory; and changing the initial speed of the spindle motor when a monitored data storage quantity is recognized to be outside of a predetermined storage range a predetermined plurality of sequential times.

2. The method according to claim 1, wherein the step of determining the initial speed comprises determining an allowable maximum reading speed based on format type and condition of out-of-focus of the optical disc.

3. The method according to claim 1, wherein the step of changing the initial speed further comprises decelerating the initial speed of the spindle motor when the data storage is successively larger than an upper limit of the predetermined storage range.

4. The method according to claim 1, wherein the step of changing the initial speed further comprises accelerating the initial speed of the spindle motor when the data storage is successively smaller than a lower limit of the predetermined storage range.

5. The method according to claim 1, wherein the step of changing the initial speed further includes:

counting a waiting time for waiting the application to request a data transfer; and decelerating the initial speed for the spindle motor to rotate when the waiting time is larger than a predetermined time limit.

6. A method of reducing power consumption for a read operation of an optical reproducing apparatus, comprising:

(a) rotating a spindle motor with an allowable maximum speed, wherein the spindle motor drives an optical disc of the optical reproducing apparatus, and data read from the optical disc upon an request of data transfer is temporarily stored in a buffer memory, and then transferred to an application device;

(b) calculating a storage quantity of the buffer memory each time when the data is read and transferred;

(c) changing the allowable speed of the spindle motor when successive repetitions of (b) show that the data quantity is calculated to be outside of a predetermined storage range a predetermined plurality of sequential times.

7. The method according to claim 6, wherein step (a) further includes setting the allowable speed according to a format type and level of out-of-focus of the optical disc.

8. The method according to claim 6, wherein step (c) further comprises decelerating the allowable speed of the spindle motor when the data storage keeps being larger than a first storage quantity after performing the predetermined times of step (b).

9. The method according to claim 6, wherein step (c) further comprises accelerating the allowable speed of the spindle motor when the data storage keeps being smaller than a second storage quantity for performing the predetermined times of step (b).

10. The method according to claim 6, wherein step (c) further includes:

counting a waiting time for waiting the request of data transfer; and decelerating the allowable speed for the spindle motor to rotate when the waiting time is larger than a predetermined time limit.

\* \* \* \* \*